United States Patent
Nakanishi

(10) Patent No.: US 9,537,142 B2
(45) Date of Patent: Jan. 3, 2017

(54) METHOD FOR MANUFACTURING NEGATIVE ELECTRODE ACTIVE MATERIAL FOR NON-AQUEOUS ELECTROLYTE SECONDARY BATTERY

(71) Applicant: SHIN-ETSU CHEMICAL CO., LTD., Tokyo (JP)

(72) Inventor: Tetsuo Nakanishi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 120 days.

(21) Appl. No.: 14/687,612

(22) Filed: Apr. 15, 2015

(65) Prior Publication Data

US 2015/0221931 A1    Aug. 6, 2015

Related U.S. Application Data

(62) Division of application No. 13/113,472, filed on May 23, 2011, now Pat. No. 9,099,717.

(30) Foreign Application Priority Data

May 24, 2010 (JP) .................................. 2010-118732

(51) Int. Cl.

| | |
|---|---|
| H01M 4/82 | (2006.01) |
| H01M 6/00 | (2006.01) |
| B05D 7/00 | (2006.01) |
| B05D 3/14 | (2006.01) |
| H05H 1/02 | (2006.01) |
| B05D 3/00 | (2006.01) |
| H01M 4/1395 | (2010.01) |
| H01M 4/134 | (2010.01) |
| H01M 4/38 | (2006.01) |
| H01M 10/052 | (2010.01) |
| B02C 23/08 | (2006.01) |
| H01M 4/04 | (2006.01) |
| H01M 4/36 | (2006.01) |
| H01M 4/02 | (2006.01) |

(52) U.S. Cl.
CPC ............ *H01M 4/1395* (2013.01); *B02C 23/08* (2013.01); *H01M 4/0421* (2013.01); *H01M 4/0471* (2013.01); *H01M 4/134* (2013.01); *H01M 4/364* (2013.01); *H01M 4/38* (2013.01); *H01M 4/386* (2013.01); *H01M 10/052* (2013.01); *H01M 2004/027* (2013.01); *Y02E 60/122* (2013.01); *Y02P 70/54* (2015.11)

(58) Field of Classification Search
CPC ...... Y02E 60/12; Y02E 60/122; C23C 16/452; C23C 16/24
See application file for complete search history.

(56) References Cited

U.S. PATENT DOCUMENTS

| | | | |
|---|---|---|---|
| 5,415,756 A * | 5/1995 | Wolfe .................. | C23C 14/0036 |
| | | | 204/192.12 |
| 5,556,721 A | 9/1996 | Sasaki et al. | |
| 5,807,615 A * | 9/1998 | Sindzingre ............ | C23C 16/452 |
| | | | 118/719 |
| 6,413,672 B1 | 7/2002 | Suzuki et al. | |
| 6,685,804 B1 | 2/2004 | Ikeda et al. | |
| 6,887,511 B1 | 5/2005 | Shima et al. | |
| 7,192,673 B1 | 3/2007 | Ikeda et al. | |
| 8,734,991 B2 | 5/2014 | Takano et al. | |
| 2006/0275662 A1 | 12/2006 | Hirose et al. | |
| 2007/0254102 A1 | 11/2007 | Fukuoka et al. | |
| 2009/0239151 A1 | 9/2009 | Nakanishi et al. | |
| 2010/0266902 A1 | 10/2010 | Takano et al. | |

FOREIGN PATENT DOCUMENTS

| | | |
|---|---|---|
| CN | 101173346 A | 5/2008 |
| CN | 101567438 A | 10/2009 |
| JP | 2964732 B2 | 10/1999 |
| JP | 2000-173596 A | 6/2000 |
| JP | 3079343 B2 | 8/2000 |
| JP | 3291260 B2 | 6/2002 |
| JP | 2003/109590 A | 4/2003 |
| JP | 2004/185991 A | 7/2004 |
| JP | 2004-303593 A | 10/2004 |
| JP | 3702223 B2 | 10/2005 |
| JP | 3702224 B2 | 10/2005 |

(Continued)

OTHER PUBLICATIONS

Oct. 10, 2014 Office Action and Search Report issued in Chinese Application No. 201110139273.0.

(Continued)

*Primary Examiner* — Patrick Ryan
*Assistant Examiner* — Julian Anthony
(74) *Attorney, Agent, or Firm* — Oliff PLC

(57) ABSTRACT

The present invention is a method for manufacturing a negative electrode active material for a non-aqueous electrolyte secondary battery. The method includes depositing silicon on a substrate by vapor deposition by using a metallic silicon as a raw material, the substrate having a temperature controlled to 300° C. to 800° C. under reduced pressure; and pulverizing and classifying the deposited silicon. The resulting negative electrode active material composed of silicon particles is an active material useful as a negative electrode of a non-aqueous electrolyte secondary battery in which high initial efficiency and high battery capacity of silicon are kept, cycle performance is superior, and an amount of a change in volume decreases at the time of charge and discharge.

16 Claims, 1 Drawing Sheet

(56) References Cited

FOREIGN PATENT DOCUMENTS

| | | |
|---|---|---|
| JP | 2005/317309 A | 11/2005 |
| JP | 2006-338996 A | 12/2006 |
| JP | 4183488 B2 | 11/2008 |
| JP | 2009/170265 A | 7/2009 |
| WO | 2009/063801 A1 | 5/2009 |

OTHER PUBLICATIONS

Oct. 8, 2014 Office Action issued in U.S. Appl. No. 13/113,472.
U.S. Appl. No. 13/113,472, filed May 23, 2011 in the name of Nakanishi.
Jul. 8, 2014 Office Action issued in Japanese Application No. 2011-111972.
Mar. 30, 2015 Office Action issued in Chinese Application No. 201110139273.0.

* cited by examiner

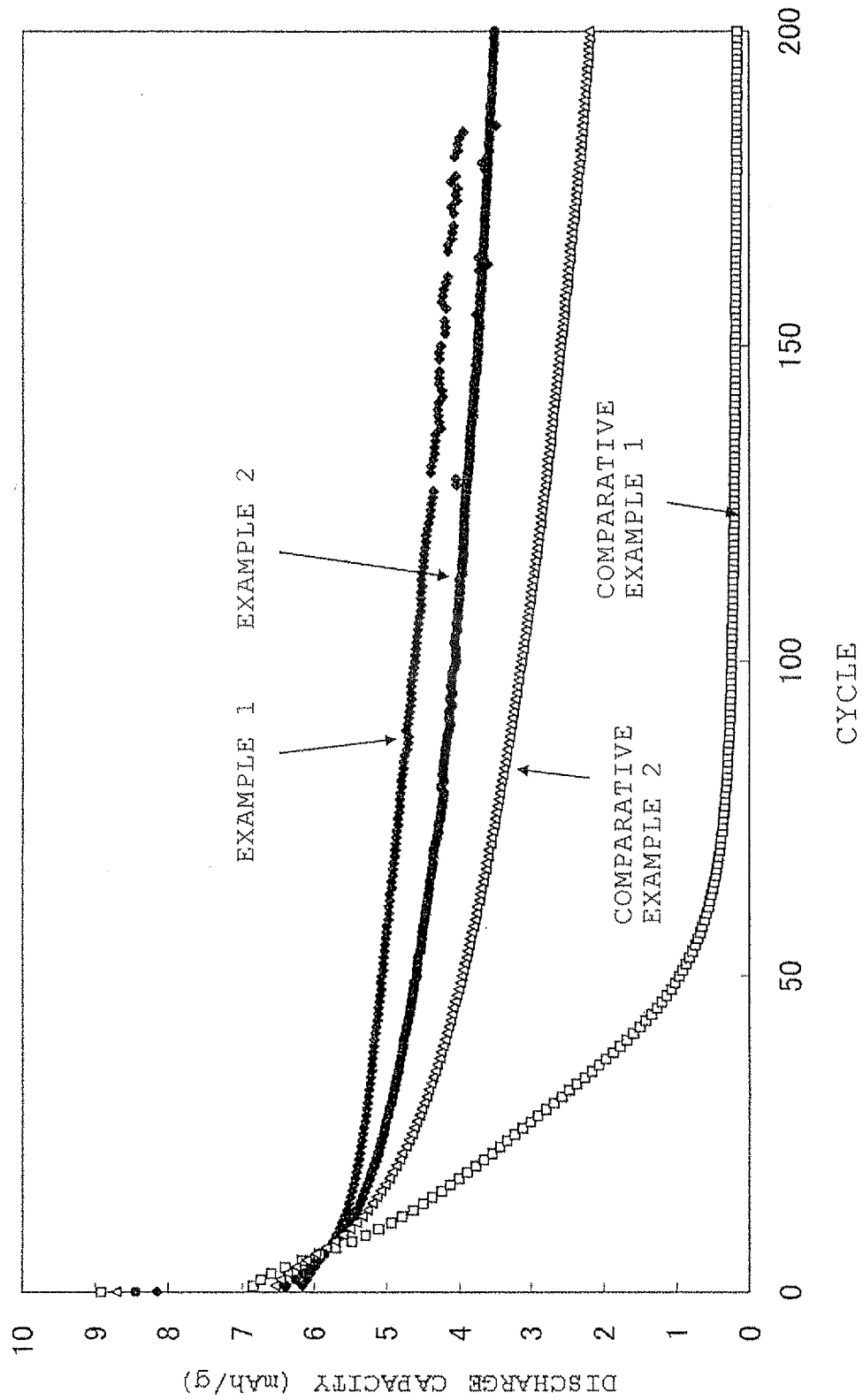

METHOD FOR MANUFACTURING NEGATIVE ELECTRODE ACTIVE MATERIAL FOR NON-AQUEOUS ELECTROLYTE SECONDARY BATTERY

CROSS REFERENCE TO RELATED APPLICATIONS

This application is a Division of application Ser. No. 13/113,472. filed May 23, 2011, and claims priority to Japanese Patent Application No. 2010-118732 filed in the Japan Patent Office on May 24, 2010. The entire contents of the prior applications are incorporated herein by reference.

BACKGROUND OF THE INVENTION

1. Field of the Invention

The present invention relates to an active material for use in a negative electrode material for a non-aqueous electrolyte secondary battery, such as a lithium ion secondary battery, particularly to silicon particles very useful as a negative electrode active material, and to a method for manufacturing the same.

Moreover, the present invention also relates to a negative electrode for a non-aqueous electrolyte secondary battery and a non-aqueous electrolyte secondary battery in which the negative electrode material is used.

2. Description of the Related Art

As portable electronic devices and communication devices are rapidly advanced in recent years, non-aqueous electrolyte secondary batteries having a high energy density are strongly desired from the aspects of cost, size and weight reductions.

Silicon is the most promising material to achieve the size reduction and capacity enhancement of the battery since it exhibits an extraordinarily high theoretical capacity of 4200 mAh/g as compared with the theoretical capacity 372 mAh/g of carbonaceous materials that are currently used in commercial batteries.

Silicon is known to take various forms of different crystalline structure depending on the preparation method thereof.

For example, Patent Literature 1 discloses a lithium ion secondary battery using single crystal silicon as a support for a negative electrode active material.

Patent Literature 2 discloses a lithium ion secondary battery using a lithium alloy $Li_xSi$ (0<=x<=5) with single crystal silicon, polycrystalline silicon or amorphous silicon, where particularly $Li_xSi$ with amorphous silicon is preferable, and a pulverized crystalline silicon coated with amorphous silicon obtained by plasma decomposition of monosilane is exemplified.

In this case, however, 30 parts of a silicon component and 55 parts of graphite as a conductive agent are used therein as described in Example, the potential battery capacity of silicon cannot be fully taken advantage of.

Patent Literatures 3 to 5 disclose a method in which an electrode current collector having a thin amorphous silicon film accumulated thereon by a vapor deposition method is used as a negative electrode.

There is disclosed a method for suppressing the degradation of cycle performance due to volume expansion by controlling the growth direction, in the method of vapor-phase-growing silicon directly on the current collector (See Patent Literature 6). This method allegedly enables the negative electrode having high capacity and good cycle performance to be manufactured. However, there are problems that cost is high due to a limited production rate, it is difficult to thicken the thin silicon film, and further copper that is the electrode current collector is dispersed to the silicon.

Recently, in view of these, there are disclosed a method for suppressing volume expansion by using silicon particles and restricting the utilization ratio of the silicon battery capacity (Patent Literatures 7 to 9), a method for utilizing grain boundaries in polycrystalline particles as the buffer to volumetric changes by rapidly cooling a melt of silicon having alumina added thereto (Patent Literature 10), polycrystalline particles of mixed phase polycrystals of α- and β-FeSi$_2$ (Patent Literature 11), and high temperature plastic working of a single crystal silicon ingot (Patent Literature 12).

As described above, metallic silicon and silicon alloy with various crystal structures are suggested to utilize silicon as the active material. Any of these has a disadvantage in cost, and the manufacturing method that enables mass synthesis at low-cost has not been suggested yet.

CITATION LIST

Patent Literature

Patent Literature 1: Japanese Patent No. 2964732
Patent Literature 2: Japanese Patent No. 3079343
Patent Literature 3: Japanese Patent No. 3702223
Patent Literature 4: Japanese Patent No. 3702224
Patent Literature 5: Japanese Patent No. 4183488
Patent Literature 6: Japanese Unexamined Patent publication (Kokai) No. 2006-338996
Patent Literature 7: Japanese Unexamined Patent publication (Kokai) No. 2000-173596
Patent Literature 8: Japanese Patent No. 3291260
Patent Literature 9: Japanese Unexamined Patent publication (Kokai) No. 2005-317309
Patent Literature 10: Japanese Unexamined Patent publication (Kokai) No. 2003-109590
Patent Literature 11: Japanese Unexamined Patent publication (Kokai) No. 2004-185991
Patent Literature 12: Japanese Unexamined Patent publication (Kokai) No. 2004-303593

SUMMARY OF THE INVENTION

The present invention was accomplished in view of the aforementioned problems, and it is an object of the present invention to provide a method for manufacturing, at low-cost, a negative electrode active material composed of silicon particles that is an active material useful for a negative electrode of a non-aqueous electrolyte secondary battery in which high initial efficiency and high battery capacity of silicon are kept, cycle performance is superior, and an amount of a change in volume decreases at the time of charge and discharge, and to provide such a negative electrode active material, a negative electrode material for a non-aqueous electrolyte secondary battery with the negative electrode active material and a negative electrode with the negative electrode active material, and a new non-aqueous electrolyte secondary battery.

In order to accomplish the above object, the present invention provides a method for manufacturing a negative electrode active material for a non-aqueous electrolyte secondary battery including at least depositing silicon on a substrate by vapor deposition by using a metallic silicon as a raw material, the substrate having a temperature controlled to 300° C. to 800° C. under reduced pressure, and pulverizing and classifying the deposited silicon.

In the event that polycrystalline silicon particles obtained by the above-described method including at least depositing silicon on the substrate by vapor deposition by using the metallic silicon as a raw material, the substrate having a temperature controlled to 300° C. to 800° C. under reduced pressure, and pulverizing and classifying the deposited silicon, is used for the negative electrode active material for a non-aqueous electrolyte secondary battery, the non-aqueous electrolyte secondary battery can be obtained in which high initial efficiency and high battery capacity of silicon are kept, the cycle performance is superior, and the change in volume decreases at the time of charge and discharge.

Moreover, the polycrystalline silicon particles suitable for the negative electrode active material having superior battery characteristics can be mass-manufactured by using a low-cost metallic silicon as a raw material, and manufacturing cost can be greatly reduced as compared with conventional methods.

The deposited silicon can be successively subjected to a heat treatment at 600° C. to 1100° C. under an inert atmosphere or reduced pressure. The heat treatment can be performed in a silicon bulk state after the deposition or in a state after pulverizing and classifying. The heat treatment preferably performed for approximately 1 to 5 hours, and particularly at 800° C. to 1000° C. The heat treatment effects the alleviation of the internal strain of the deposited particles and, as an unexpected effect, the decrease in a BET specific surface area.

In this case, the silicon to be deposited is preferably doped with one or more of dopant selected from boron, aluminum, phosphorus, titanium, vanadium, chromium, manganese, iron, cobalt, nickel, copper, zinc, arsenic, tin, tantalum, and tungsten, at the time of the depositing of the silicon on the substrate by vapor deposition by using the metallic silicon as a raw material.

In this manner, when the silicon to be deposited is doped with one or more of dopant selected from boron, aluminum, phosphorus, titanium, vanadium, chromium, manganese, iron, cobalt, nickel, copper, zinc, arsenic, tin, tantalum, and tungsten, at the time of the depositing of the silicon on the substrate by vapor deposition, the bulk conductivity of the obtained negative electrode active material can be more improved, and the negative electrode active material that enables the secondary battery superior in the cycle performance can be obtained.

Moreover, the pulverizing and the classifying are preferably performed so that a particle size of the negative electrode material for a non-aqueous electrolyte secondary battery becomes neither less than 1 μm nor more than 20 μm by a volume average $D_{50}$ based on a measurement method of particle size distribution by a laser diffraction scattering.

When $D_{50}$ is not less than 1 μm, the risks of increase in a specific surface area and of decrease in negative electrode film density can be lowered as much as possible. When $D_{50}$ is not more than 20 μm, the risk of causing short-circuits by the particle penetrating a negative electrode film can be minimally suppressed, and the risk of separation from a current collector can be sufficiently suppressed without difficulty of the formation of the electrode.

The BET specific surface area of the negative electrode active material can be made 0.1 to 5.0 $m^2/g$ by pulverizing and classifying the silicon so as to have the above-described particle size. Particularly, when the temperature of the vapor deposition substrate is less than 300° C., the BET specific surface area exceeds 5.0 $m^2/g$, and the decomposition reaction of an electrolyte is unnecessarily accelerated due to increase in the surface area. For reasons of this, an amount of a necessary binder increases, and therefore the battery capacity of the electrode undesirably decreases.

Moreover, the substrate is preferably composed of a material incapable of alloying with silicon at the time of the depositing of silicon.

In this manner, when the metallic silicon as a raw material is vapor-deposited on the substrate composed of a material incapable of alloying with silicon at the time of the depositing of silicon, diffusion of unnecessary metallic impurities can be prevented, the accumulated silicon can be readily separated from the substrate at the time of pulverizing and classifying the accumulated silicon, and thus the pulverizing and classifying can be readily started. As a result, the productivity becomes high, and the method for manufacturing a negative electrode active material can be performed at low-cost.

Furthermore, the present invention provides a negative electrode active material for a non-aqueous electrolyte secondary battery manufactured by the method for manufacturing a negative electrode material for a non-aqueous electrolyte secondary battery according to the present invention.

As described above, the negative electrode active material composed of the polycrystalline silicon particles obtained by the method for manufacturing a negative electrode material according to the present invention is lower-cost as compared with conventional negative electrode active materials, is superior in cycle performance, and is suitable for the non-aqueous electrolyte secondary battery in which the amount of the volume change at the time of charge and discharge decreases while high initial efficiency and high battery capacity of silicon are kept.

Furthermore, the present invention provides a negative electrode active material for a non-aqueous electrolyte secondary battery including at least polycrystalline silicon having a true density of more than 2.250 $g/cm^3$ and less than 2.330 $g/cm^3$, having a BET specific surface area of 0.1 to 5.0 $m^2/g$ and having a particle compressive strength of more than 400 MPa and less than 800 MPa, wherein a silicon grain in the polycrystal has a grain size of neither less than 20 nm nor more than 100 nm, the grain size being obtained by a Scherrer method based on a full width at half maximum of a diffraction line attributable to Si (111) and near $2\theta=28.4°$ in a pattern analysis of x-ray diffraction.

The negative electrode active material composed of the above-described polycrystalline silicon particles has a true density of more than 2.250 $g/cm^3$ and less than 2.330 $g/cm^3$, which is lower than that of metallic silicon (2.33 $g/cm^3$), has a particle compressive strength larger than that of single crystal silicon (400 MPa) by approximately 100 MPa, and thus has a crystal composition capable of enduring strain due to volume expansion. That is, the volume expansion due to charge is suppressed to from one half to one third as compared with general metallic silicon and polycrystalline silicon. When this negative electrode active material composed of the polycrystalline silicon particles having a very low amount of volume expansion is used for the negative electrode, the capacity becomes high, electrode density at the time of charge becomes 0.4 to 0.9 $g/cm^3$, and the battery capacity per volume can be thus increased. Since the BET specific surface area is 0.1 to 5.0 $m^2/g$, there is a little diffusion of the electrolyte on a surface thereof, and a large amount of binder is not needed. Moreover, since the silicon grain in the polycrystal has a grain size of neither less than 20 nm nor more than 100 nm, which is obtained by a Scherrer method based on a full width at half maximum of a diffraction line attributable to Si (111) and near 2θ=28.4° in a pattern analysis of x-ray diffraction, the first efficiency, the capacity, and the cycle performance are prevented from deteriorating.

That is, the negative electrode active material for a non-aqueous electrolyte secondary battery enables the cycle performance and the volume change at the time of charge and discharge, which are conventionally a weak point of silicon, to be greatly improved while the characteristics of silicon that is superior in initial efficiency and battery capacity are kept.

Furthermore, the present invention provides a negative electrode material for a non-aqueous electrolyte secondary battery composed of at least the negative electrode active material for a non-aqueous electrolyte secondary battery according to the present invention.

As described above, the negative electrode material composed of the negative electrode active material according to the present invention has an aspect of silicon superior in the initial efficiency and battery capacity, is mainly composed of the polycrystalline silicon particles having a low volume change ratio and cycle performance, and the negative electrode material is suitable for the negative electrode of the non-aqueous electrolyte secondary battery superior in battery characteristics, such as the cycle performance, and charge-discharge characteristics, than conventional ones.

In this case, the negative electrode material according to the present invention preferably further includes the binder.

In this manner, when the negative electrode material includes the binder, the negative electrode material can be prevented from being destroyed or changed into powder surely and readily even when the expansion and contraction due to charge and discharge are repeated, and the conductivity of the electrode itself can be made high.

Moreover, the binder is preferably a polyimide resin.

In this manner, when the binder is a polyimide resin, the negative electrode material for a non-aqueous electrolyte secondary battery is superior in adhesiveness with the current collector, such as a copper foil, has high first charge and discharge efficiency, enables the volume change at the time of charge and discharge to be alleviated, and has good cycle performance and cycle efficiency in repetition.

Moreover, it is preferable that the negative electrode material further includes a conductive agent and that a mass ratio of the negative electrode active material for a non-aqueous electrolyte secondary battery is 60 to 97 mass %, a mass ratio of the binder is 3 to 20 mass %, and a mass ratio of the conductive agent is 0 to 37 mass %, with respect to the negative electrode material for a non-aqueous electrolyte secondary battery respectively.

In this manner, when the negative electrode material includes the conductive agent and the composition proportion of the negative electrode active material, the binder, and the conductive agent is in the above-described range respectively, the negative electrode material can be prevented from being destroyed or changed into powder surely and readily even when the expansion and contraction due to charge and discharge are repeated, the conductivity of the negative electrode material can be made high, and the negative electrode material for a non-aqueous electrolyte secondary battery is thus superior in the cycle performance.

Moreover, it is preferable that the conductive agent is composed of a dispersion liquid having a conductive material dispersed to water or solvent, and a mass ratio of the conductive material is 1 to 37 mass % with respect to the negative electrode material for a non-aqueous electrolyte secondary battery.

When the negative electrode material includes the conductive agent in the above-described proportion, the conductivity of the negative electrode material becomes sufficiently high, and first resistance can be sufficiently suppressed to a low level. In addition to these, decrease in the battery capacity can be surely prevented, and this is thus preferable.

Furthermore, the present invention provides a negative electrode for a non-aqueous electrolyte secondary battery including the negative electrode material for a non-aqueous electrolyte secondary battery according to the present invention, wherein a thickness of the negative electrode changed after charge is less than three times than the thicknesses before charge.

As described above, in the negative electrode material for a non-aqueous electrolyte secondary battery according to the present invention, the volume expansion due to charge is lower as compared with general metallic silicon and polycrystalline silicon, and the negative electrode material is superior in the battery capacity and cycle performance. In the negative electrode using the negative electrode material for a non-aqueous electrolyte secondary battery as above, the volume expansion between before and after charge is therefore more suppressed and is smaller as compared with conventional ones, the thicknesses thereof changed after charge is less than three times than the thicknesses before charge, and it is superior in the battery characteristics.

Furthermore, the present invention provides a non-aqueous electrolyte secondary battery including at least a negative electrode molded by using the negative electrode for a non-aqueous electrolyte secondary battery according to the present invention, a positive electrode, a separator, and a non-aqueous electrolyte.

As described above, the negative electrode for a non-aqueous electrolyte secondary battery according to the present invention is suitable for the secondary battery in which the deformation thereof is small, the decrease in the capacity is suppressed to a low level, and the cycle performance and charge-discharge characteristics are superior. The non-aqueous electrolyte secondary battery including the negative electrode molded by using the above-described negative electrode is also highly superior in the cycle performance and charge-discharge characteristics.

In this case, the non-aqueous electrolyte secondary battery is preferably a lithium ion secondary battery.

As described above, in the non-aqueous electrolyte secondary battery according to the present invention, the deformation thereof is small, the decrease in the capacity is suppressed to a low level, and the cycle performance and charge-discharge characteristics are superior. This battery is therefore highly suitable for a lithium ion secondary battery, which is strongly expected to achieve a high energy density recently.

As explained above, the present invention uses the low-cost metallic silicon as a raw material, and thereby can mass-manufacture and provide, at low-cost, the polycrystalline silicon particles as an active material that is useful for the negative electrode of a non-aqueous electrolyte secondary battery in which high initial efficiency and high battery capacity of silicon are kept, the cycle performance is superior, and the amount of the volume change decreases at the time of charge and discharge. In addition, the present invention provides the negative electrode material and negative electrode using the negative electrode active material composed of the polycrystalline silicon particles as above, and also provides the non-aqueous electrolyte secondary battery that is superior in adhesiveness with the current collector, has high initial efficiency and has good cycle performance and charge-discharge efficiency in repetition due to alleviation of the volume change at the time of charge and discharge.

BRIEF DESCRIPTION OF THE DRAWINGS

FIG. 1 is a graph showing the comparison of changes in discharge capacity based on charge-discharge tests of lithium secondary batteries for evaluation manufactured by using negative electrode active materials for a non-aqueous electrolyte secondary battery in Examples 1 and 2, and Comparative Example 1 and 2.

DETAILED DESCRIPTION OF THE PREFERRED EMBODIMENTS

Hereinafter, the present invention will be explained in more detail.

The present inventor has repeatedly keenly conducted studies on silicon-based active materials enabling a battery capacity per volume of more than 844 mAh/cc of a carbonaceous material, and further, more than 1500 mAh/cc, which is expected for Si alloy-based negative electrode active materials disclosed before, and on a method for manufacturing the materials at low-cost.

As a result, the present inventor has found the following. A method of depositing silicon on a substrate having a temperature controlled to 300° C. to 800° C. by vapor deposition by using a metallic silicon as a raw material, and pulverizing and classifying the deposited silicon by a known pulverizing and classifying method can obtain polycrystalline silicon particles composed of polycrystalline silicon having a true density of more than 2.250 g/cm$^3$ and less than 2.330 g/cm$^3$, having a BET specific surface area of 0.1 to 5.0 m$^2$/g and having a particle compressive strength larger than that of single crystal silicon (400 MPa) by approximately 100 MPa, in which a silicon grain in the polycrystal has a grain size of neither less than 20 nm nor more than 100 nm, obtained by a Scherrer method based on a full width at half maximum of a diffraction line attributable to Si (111) and near 2θ=28.4° in a pattern analysis of x-ray diffraction. This polycrystalline silicon particle is a useful active material for the negative electrode for a non-aqueous electrolyte secondary battery in which high initial efficiency and high battery capacity of silicon of more than 1500 mAh/cc are kept, the cycle performance is superior, and the amount of the volume change is suppressed at the time of charge and discharge. Moreover, the low-cost metallic silicon can be used as a raw material, and consequently the manufacturing cost can be greatly reduced as compared with conventional ones.

The present inventor also has found that the negative electrode material and negative electrode using this negative electrode active material, and the non-aqueous electrolyte secondary battery using these are superior in battery characteristics, such as initial efficiency, battery capacity, and cycle performance, and can be manufactured at low-cost. The present inventor thereby has brought the present invention to completion.

Hereinafter, the present invention will be explained in detail with reference to the drawings. However, the present invention is not restricted thereto.

The negative electrode active material for a non-aqueous electrolyte secondary battery according to the present invention includes at least polycrystalline silicon having a true density of more than 2.250 g/cm$^3$ and less than 2.330 g/cm$^3$, having a BET specific surface area of 0.1 to 5.0 m$^2$/g and having a particle compressive strength of more than 400 MPa and less than 800 MPa, in which a silicon grain in the polycrystal has a grain size of neither less than 20 nm nor more than 100 nm, obtained by a Scherrer method based on a full width at half maximum of a diffraction line attributable to Si (111) and near 2θ=28.4° in a pattern analysis of x-ray diffraction.

The polycrystalline silicon particle described in the present invention has a feature that the BET specific surface area is 0.1 to 5.0 m$^2$/g when the particle size is neither less than 1 μm nor more than 20 μm by a volume average D$_{50}$ based on the measurement method of particle size distribution by the laser diffraction scattering, and the BET specific surface area is equal with that of single crystal silicon, while the true density is more than 2.250 g/cm$^3$ and less than 2.330 g/cm$^3$, which is lower than 2.33 g/cm$^3$ of single crystal silicon.

The polycrystalline silicon particle is characterized in that the true density of the particle is small, the BET specific surface area is small, and the crystallite structure thus has not a porous structure but a disorderly form that is near to amorphous. With this crystallite structure, the polycrystalline silicon particle has a feature that the particle compressive strength is larger than that of single crystal silicon by 100 MPa.

The polycrystalline silicon particle described in the present invention is an aggregate of crystal grains having a grain size of neither less than 20 nm nor more than 100 nm, obtained by a Scherrer method based on the full width at half maximum of a diffraction line attributable to Si (111) and near 2θ=28.4° in a pattern analysis of x-ray diffraction.

The volume expansion due to charge and discharge is smaller and suppressed to from one half to one third as compared with general metallic silicon and polycrystalline silicon by the effect on the alleviation of the volume expansion at grain boundaries between the nano-size grains. When the polycrystalline silicon particle is used for the negative electrode of the non-aqueous electrolyte secondary battery, it can therefore endure the stress caused by the change in volume expansion due to charge and discharge. In addition, it has high capacity, and the battery capacity per volume can be increased.

Since the BET specific surface area is small, there is a little decomposition of the electrolyte on the surface, the amount of the binder in the negative electrode material can be reduced, and increase in irreversible capacity can be minimally suppressed. Since the polycrystalline silicon particle is the aggregate of crystal grains having a grain size of neither less than 20 nm nor more than 100 nm, the strain of the grain caused by the volume change due to charge and discharge is small, and this is a suitable range for preventing the first efficiency, the capacity, and the cycle performance from deteriorating.

The characteristics of silicon superior in the initial efficiency and the battery capacity are therefore kept, and the cycle performance and the volume change at the time of charge and discharge, which are conventionally weak points of silicon, can be greatly improved. It is the negative electrode active material useful for improving the battery characteristics.

Next, the method for manufacturing a negative electrode active material for a non-aqueous electrolyte secondary battery according to the present invention, the negative electrode material composed of the negative electrode active material, the negative electrode, and the non-aqueous electrolyte secondary battery will be explained in more detail. However, the present invention is not restricted thereto.

First, silicon is deposited on the substrate by vapor deposition by using a metallic silicon as a raw material, and the substrate has a temperature controlled to 300° C. to 800° C. under reduced pressure.

Here, as the silicon, there has been known single crystal silicon, polycrystalline silicon and amorphous silicon classified according to the difference of crystallinity, and chemical grade silicon called metallic silicon and metallurgical grade silicon classified according to purity.

The polycrystalline silicon among them is crystal having partial regularity. On the other hand, the amorphous silicon is different from the polycrystalline silicon from the viewpoint of the arrangement of Si atoms almost without regularity in the amorphous silicon and a mesh structure. The polycrystalline silicon is composed of differently-oriented crystal grains having a relatively large size, and has crystal grain boundaries between each of the crystal grains.

As described in, for example, Complete Series of Inorganic Chemistry, Vol. XII-2, Silicon (Maruzen Co., Ltd.), p184, the polycrystalline silicon can be synthesized from monosilane or trichlorosilane by the vapor deposition method.

In the vapor deposition method with a silane gas, however, a costly silane gas with high purity is used, thereby the polycrystalline silicon to be obtained is also costly, and the non-aqueous electrolyte secondary battery is necessarily costly, although this is a useful method for obtaining the polycrystalline silicon with high purity.

The known vapor-depositing methods on a copper current collector (See Patent Literatures 3 to 5, for example) obtain amorphous silicon by controlling the temperature of the substrate to less than 300° C. In this case, even when the amorphous silicon taken out is pulverized and classified so that an average particle size becomes 1 to 20 μm, the BET specific surface area becomes 10 to 30 $m^2/g$.

This BET specific surface area value is very longer as compared with the case of pulverizing the metallurgical grade metallic silicon, and thereby there arises a problem that the decomposition of the electrolyte on the surface of the active material increases, and a large amount of binder is needed to prevent the inside of the electrode from being destroyed.

On the other hand, the present invention utilizes not the silane gas but metallic silicon directly as a raw material to be accumulated by the vapor deposition method. As the metallic silicon, a low-cost metallic silicon called metallurgical grade or chemical grade can be used.

It is important to control the temperature of the substrate on which the metallic silicon raw material is vapor-deposited, to 300 to 800° C.

Various methods for vapor-depositing silicon are known according to heating method. An electron beam heating method is advantageous which has better heat efficiency than an induction heating method. In the method for vapor-depositing silicon by the electron beam heating method, for example, a raw material of metallic silicon is contained in a copper hearth, and the pressure in a chamber is reduced. The reduced pressure can be commonly $1 \times 10^{-5}$ to $1 \times 10^{-2}$ Pa. The amount of vapor deposition is expected to increase under a reduced pressure of $1 \times 10^{-5}$ Pa or less. The load applied to reducing-pressure apparatus, however, is very high, and it is thereby apt to be costly apparatus. On the other hand, the output of an electronic gun is not stabilized under a reduced pressure of $1 \times 10^{-2}$ Pa or more, and it is hard to heat by the electron beam. The output of the electronic gun other than the reduced pressure in the chamber is one of conditions in the case of radiating the electron beam to the metallic silicon to deposit the metallic silicon. The output is preferably 100 to 200 kW in case of a melt amount of approximately 20 kg or less.

The method for controlling the temperature of the substrate to 300 to 800° C. is not restricted in particular. For example, a method of incorporating a hot line into the vapor deposition substrate, and an indirect heating method by an infrared heater and the like are exemplified. In the case of using a cylindrical vapor deposition substrate, a heating medium may be used together with the incorporated heater. Since the temperature of the vapor deposition substrate may become higher than a desired temperature due to radiant heat from the melt during the vapor deposition, it is desirable that a cooling medium is usable as well as the heating medium. It is to be noted that a contacting method by a sheathed thermocouple, a platinum resistance temperature detector or the like, and a non-contacting method by a radiation thermometer, an optical pyrometer, or the like may be adopted for the temperature control of the vapor deposition substrate.

As described above, when the temperature of the substrate is controlled to 300° C. to 800° C., the BET specific surface area of the negative electrode active material to be thereafter manufactured by the pulverizing and classifying can be made to fall in the range of 0.1 to 5.0 $m^2/g$. The BET specific surface area is 0.1 to 5.0 $m^2/g$, and more desirably 0.1 to 2.0 $m^2/g$.

Particularly, when the temperature of the substrate is controlled to 400° C. to 600° C., the polycrystalline silicon having a small the BET specific surface area and a small particle size can be obtained.

The substrate is desirably composed of a material incapable of alloying with silicon at the time of the depositing of the silicon. Here, the material incapable of alloying with silicon at the time of the depositing of the silicon means that silicon is not adhered to the substrate at the time of the depositing of the silicon, that the substrate is hard to alloy with silicon, and that silicon is easy to be separated from the substrate. For example, stainless steel or stainless steel having a plated surface can be used as the material. The surface may be subjected to mirror polishing processing.

As described above, when the vapor deposition substrate is composed of the material incapable of alloying with silicon at the time of the depositing of the silicon, silicon accumulated on the substrate can be readily separated from the substrate, and the pulverizing and classifying can be readily carried out. The productivity can be thereby improved, and the negative electrode active material can be manufactured at lower-cost.

Moreover, the BET specific surface area of the deposited silicon can be decreased by performing a heat treatment at 600° C. to 1100° C. under an inert atmosphere or reduced pressure. The heat treatment can be performed in a silicon bulk state after the deposition or in a state after pulverizing and classifying. The heat treatment is preferably performed for approximately 1 to 5 hours, and particularly at 800 to 1000° C. for 1 to 3 hours. The heat treatment effects the alleviation of the internal strain of the deposited particle and the decrease in the BET specific surface area.

The measurement by powder x-ray diffraction is useful for a physical criterion of crystal grains of the polycrystalline silicon.

In the present invention, the grain size is neither less than 20 nm nor more than 100 nm (preferably, neither less than 20 nm nor more than 80 nm), and the grain size is obtained by a Scherrer method based on the full width at half maximum of a diffraction line attributable to Si (111) and near 2θ=28.4° in a pattern analysis of x-ray diffraction by using SRM640c (single crystal silicon), which is a x-ray diffraction criterion specimen made by NIST.

On the other hand, a grain size of a metallic silicon and of a polycrystalline silicon manufactured by a conventional method, such as an unidirectional solidification method, a quenching method, and high temperature plastic working method, is 500 to 700 nm, and this is unsuitable for the non-aqueous electrolyte secondary battery.

Moreover, the polycrystalline silicon manufactured by a direct vapor deposition method from the metallic silicon according to the present invention has a true density of more than 2.250 g/cm$^3$ and less than 2.330 g/cm$^3$, and this value is lower than that of single crystal silicon. The true density of metallic silicon is 2.330 g/cm$^3$. The true density of the polycrystalline silicon according to the present invention is remarkably different from that of metallic silicon.

Moreover, the particle compressive strength is useful for a mechanical criterion of a crystallite of the polycrystalline silicon.

Here, in an alloy-based active material, the volume change is characteristically large in the process of occluding and emitting lithium. As conventionally known, while the volume expansion of a graphite-base active material is approximately 1 to 1.2 times, the volume expansion of a silicon-based active material is approximately up to 4 times. It is therefore necessary to suppress a problem that the particles cannot endure strain caused by volume expansion due to charge and the particles are pulverized with the progress of cycle.

The particle compressive strength of single crystal silicon measured by a micro compression testing machine (made by SHIMADZU Corp.) is 400 MPa. When amorphous silicon is made by using the vapor deposition substrate having a temperature of 300° C. or less, particles having a particle compressive strength of 100 MPa are observed. These fragile particles become fine powder as the cycle progresses. This causes the destruction of the negative electrode.

Therefore, the compressive strength is preferably more than 400 MPa and less than 800 MPa, and more preferably 600 MPa or less. The particle compressive strength of 800 MPa or more needs a long time for pulverizing processing, and it may be undesirable in some cases.

The silicon to be deposited can be doped with one or more of dopant selected from boron, aluminum, phosphorus, titanium, vanadium, chromium, manganese, iron, cobalt, nickel, copper, zinc, arsenic, tin, tantalum, and tungsten, at the time of the depositing of the silicon on the substrate by vapor deposition by using the metallic silicon as a raw material.

The negative electrode active material composed of the polycrystalline silicon particles obtained by vapor-depositing the silicon on the substrate by using the metallic silicon as a raw material is inferior in bulk conductivity as compared with metallurgical grade metallic silicon having impurities, such as boron, phosphorus, oxygen, aluminum, iron, calcium and the like, originally. When silicon to be deposited is doped with one or more of dopant selected from boron, aluminum, phosphorus, titanium, vanadium, chromium, manganese, iron, cobalt, nickel, copper, zinc, arsenic, tin, tantalum, and tungsten, at the time of the depositing of the silicon on the substrate by vapor deposition by using the metallic silicon as a raw material, the bulk conductivity of the obtained negative electrode active material composed of the polycrystalline silicon particles can be improved, and the negative electrode active material that enables the second battery superior in cycle performance to be manufactured is obtained.

The silicon deposited by vapor deposition method and taken out from the substrate is pulverized and classified by a known method to obtain a predetermined particle size.

As a pulverizer, use may be made of, for example, a ball mill and media agitating mill in which grinding media such as balls or beads are brought in motion and an object is pulverized by utilizing impact forces, friction forces or compression forces generated by the kinetic energy; a roller mill in which pulverizing is performed by utilizing compression forces generated between rollers; a jet mill in which an object is impinged against the liner or each particle thereof is impinged at a high speed, and pulverizing is performed by impact forces generated by impingement; a hammer mill, pin mill and disc mill in which a rotor with hammers, blades or pins attached thereto is rotated and an object is pulverized by impact forces generated by rotation; a colloid mill utilizing shear forces; and a wet, high pressure, counter-impingement dispersing machine "Ultimizer".

Either wet or dry pulverizing may be employed.

The pulverizing is followed by dry, wet or sieve classifying in order to obtain a proper particle size distribution.

The dry classifying generally uses a gas stream and includes successive or simultaneous processes of dispersion, separation (segregation between fine and coarse particles), collection (separation between solid and gas), and discharge. To prevent the classifying efficiency from being reduced by the impacts of interference between particles, particle shape, turbulence and velocity distribution of the gas stream, electrostatic charges, or the like, pretreatment (adjustment of water content, dispersibility, humidity or the like) is carried out prior to the classifying, or the gas stream is adjusted in moisture content and oxygen concentration prior to use.

An integrated type of dry pulverizer and classifier can conduct pulverizing and classifying operations at a time to obtain desired particle size distribution.

The pulverizing and the classifying can be performed so that a particle size of the negative electrode active material for a non-aqueous electrolyte secondary battery becomes neither less than 1 μm nor more than 20 μm by a volume average $D_{50}$ (a particle size or median diameter when cumulative volume is 50%) based on a measurement method of particle size distribution by a laser diffraction scattering.

When it is performed so that $D_{50}$ becomes not less than 1 μm, the risk of a decrease in bulk density and in charge-discharge capacity per volume can be reduced as much as possible.

When $D_{50}$ is not more than 20 μm, risks of increase in a specific surface area and of a decrease in negative electrode film density can be lowered as much as possible. When $D_{50}$ is not more than 20 μm, the risk of causing short-circuits by the particle penetrating the negative electrode film can be minimally suppressed, and the risk of separation from the current collector can be sufficiently suppressed without difficulty of the formation of the electrode.

The above-described polycrystalline silicon particles pulverized to a predetermined particle size beforehand can be further formed a carbon film thereon to improve conductivity by performing thermal chemical vapor deposition treatment at a temperature of 600 to 1,200° C. (preferably 800 to 1,000° C.) under atmospheric pressure or reduced pressure in the shortest possible time with introducing a hydrocarbon compound gas and/or vapor.

The negative electrode active material composed of the above-described polycrystalline silicon particles manufactured by the method according to the present invention can be used as the negative electrode active material for a non-aqueous electrolyte secondary battery. This negative electrode active material has higher capacity as compared with a graphite used at present, and has lower irreversible capacity as compared with silicon oxide and a material using silicon oxide as a raw material (for example, (silicon/silicon dioxide dispersing compounds) obtained by the disproportionation of silicon oxide). Moreover, the negative electrode active material enables the non-aqueous electrolyte secondary battery superior in cycle performance, and particularly the lithium ion secondary battery to be manufactured. This superior cycle performance means, for example, that the volume change due to charge and discharge is controlled to be smaller than that of metallic silicon itself, and adhesion between the particles and the binder is superior.

Moreover, since the negative electrode active material is manufactured by using low-cost metallic silicon as a raw material, it is advantageously very low-cost and simultaneously has superior battery characteristics, and the manufacturing cost of the non-aqueous electrolyte secondary battery can be thus reduced.

A binder can be used for manufacturing the negative electrode material from the active material containing the polycrystalline silicon particles according to the present invention. Particularly, a polyimide resin can be used as the binder. A polyamide resin and particularly an aromatic polyimide resin can be also adopted other than the polyimide resin. For example, the aromatic polyimide resin has good solvent resistance, and can suppress the separation from the current collector and the separation of the active material accompanied by the volume expansion due to charge and discharge.

The aromatic polyimide resin is generally hardly-soluble in organic solvents and must not effect the swelling or be dissolved in electrolyte.

In general, the aromatic polyimide resin is soluble only in high-boiling organic solvents, for example, cresol. An electrode paste may be prepared by adding polyimide precursors in a state of a polyamic acid that is relatively easily soluble in various organic solvents such as dimethylformamide, dimethylacetamide, N-methylpyrrolidone, ethyl acetate, acetone, methyl ethyl ketone, methyl isobutyl ketone, and dioxolan, and the paste is thereafter subjected to heat treatment at a temperature of 300° C. or more for a long time for thereby effecting dehydration and imidization. The binder is desirably obtained by this method.

In this case, the aromatic polyimide resin has a basic skeleton composed of tetracarboxylic dianhydrides and diamines. For example, preferable tetracarboxylic dianhydrides include aromatic tetracarboxylic dianhydrides such as pyromellitic dianhydride, benzophenonetetracarboxylic dianhydride and biphenyltetracarboxylic dianhydride, alicyclic tetracarboxylic dianhydrides such as cyclobutanetetracarboxylic dianhydride, cyclopentanetetracarboxylic dianhydride and cyclohexanetetracarboxylic dianhydride, and aliphatic tetracarboxylic dianhydrides such as butanetetracarboxylic dianhydride.

Suitable diamines include aromatic, alicyclic and aliphatic diamines such as p-phenylene diamine, m-phenylene diamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy)diphenyl sulfone, 2,2'-bis[4-(4-aminophenoxy)phenyl]propane.

Synthesis of polyamic acid intermediate is commonly carried out by a solution polymerization process. The process uses a solvent such as N,N'-dimethylformamide, N,N'-dimethylacetamide, N-methyl-2-pyrrolidone, N-methylcaprolactam, dimethyl sulfoxide, tetramethyl urea, pyridine, dimethyl sulfone, hexamethylphosphoramide, and butyrolactone, alone or in admixture.

In this case, the reaction temperature is commonly in the range of −20 to 150° C., and desirably −5 to 100° C.

The polyamic acid intermediate is converted into a polyimide resin typically by heating to induce dehydration and cyclization. Heating for dehydration and cyclization may be performed at any temperature in the range of 140 to 400° C. and preferably 150 to 250° C. The time taken for dehydration and cyclization is 30 seconds to 10 hours, and preferably 5 minutes to 5 hours, depending on the heating temperature.

As the polyimide resin, polyimide resin powder and N-methylpyrrolidone solution of polyimide precursors are commercially available. Examples include U-Varnish A, U-Varnish S, UIP-R and UIP-S (Ube Industries Ltd.), KAYAFLEX KPI-121 (Nippon Kayaku Co., Ltd.), and Rikacoat SN-20, PN-20 and EN-20 (New Japan Chemical Co., Ltd.)

With regard to a mass ratio of the negative electrode active material and the binder in the negative electrode material according to the present invention, the mass ratio of the negative electrode active material may be 60 to 97 mass % (preferably 70 to 95 mass %, and more preferably 75 to 95 mass %). It is to be noted that, in the case of containing the later-explained conductive agent in the negative electrode material, the maximum mass ratio of the negative electrode material is preferably 96 mass % or less (94 mass % or less, and particularly 93 mass % or less).

Moreover, the mass ratio of the binder in the negative electrode material is preferably 3 to 20 mass % (more preferably 5 to 15 mass %) with respect to whole of the active material. When the mass ratio of the binder is in the above-described range, the risk of the separation of the negative electrode material can be reduced as much as possible, voids are reduced so that an insulator film becomes thick, and the risk of interfering with the movement of Li ions can be reduced as much as possible.

When the negative electrode material is manufactured by using the polycrystalline silicon particles as the active material and polyimide resins and the like as the binder, the conductive agent, such as graphite, can be added thereto.

In this case, the type of conductive agent used herein is not restricted in particular as long as it is an electronically conductive material which does not cause decomposition or alteration in the battery to be manufactured. Specific conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

Moreover, each of the conductive agents is preferably added in solvent dispersion form because an electrode paste in which the conductive agent is uniformly distributed and bonded to the polycrystalline silicon particle is obtained by previously dispersing the conductive agent in a solvent such as water or N-methyl-2-pyrrolidone and adding the dispersion. It is to be noted that any well-known surfactant may be used to disperse the conductive agent in the solvent. The solvent used for the conductive agent is desirably the same as the solvent used for the binder.

In the case of using the conductive agent, the mass ratio of the conductive material is preferably 0 to 37 mass % (more preferably 1 to 37 mass %) with respect to whole of the negative electrode. Furthermore, in the case of containing the conductive agent in water or solution, the mass ratio of the conductive material is preferably 1 to 37 mass % (more preferably 1 to 20 mass %, and particularly 2 to 10 mass %).

When the mass ratio of the conductive agent is in the above-described range, high first resistance caused by poor conductivity of the negative electrode material can be surely suppressed. In addition, the decrease in the battery capacity due to increase in the amount of the conductive agent can be prevented.

Moreover, carboxymethyl cellulose, sodium polyacrylate, acrylic polymers or fatty acid esters may be added as a viscosity regulator to the negative electrode material together with the above-described polyimide resin binder.

The negative electrode can be made from the above-described negative electrode material for a non-aqueous electrolyte secondary battery according to the present invention by the following method.

The negative electrode material composed of the above-described negative electrode active material, the conductive agent, the binder, and other additives are mixed in a solvent suitable for dissolution and dispersion of the binder such as water or N-methylpyrrolidone to form a paste-state mixture, and the mixture is applied in sheet form to the current collector. In this case, the current collector used herein has no restriction of the thickness thereof and surface treatment as long as it is made from currently used materials for the current collector of the negative electrode, such as a copper or nickel foil. It is to be noted that the method of molding the mixture into a sheet is not restricted in particular, and any well-known method may be used.

The negative electrode including the negative electrode material for a non-aqueous electrolyte secondary battery as described above mainly includes the negative electrode material composed of the polycrystalline silicon particles in which the volume change due to charge and discharge is greatly smaller than that of conventional silicon particles, and the thicknesses of the negative electrode changed after charge is less than three times (particularly 2.5 times) than the thicknesses before charge.

The non-aqueous electrolyte secondary battery, and particularly the lithium ion secondary battery can be manufactured by using a negative electrode molded by using the negative electrode obtained as described above.

In this case, the non-aqueous electrolyte secondary battery is characterized by using the above-described molded negative electrode, and is not restricted in particular by materials of a positive material (a molded positive material), the separator, the electrolyte, and the non-aqueous electrolyte, and the battery shape.

Examples of the positive electrode active material include oxides, sulfides, and the like capable of occluding and releasing lithium ions, and they are used alone or in admixture.

Specific materials include sulfides and oxides of metals excluding lithium such as $TiS_2$, $MOS_2$, $NbS_2$, $ZrS_2$, $VS_2$, $V_2O_5$, $MoO_3$, $Mg(V_3O_8)_2$, and lithium, and lithium-containing complex oxides. Composite metals such as $NbSe_2$ and olivine iron are also usable. For increasing the energy density, lithium complex oxides based on $Li_pMetO_2$ are desirable. It is to be noted that Met is preferably at least one element of cobalt, nickel, iron and manganese and p has a value in the range: $0.05<=p<=1.10$. Specific examples of the lithium complex oxides include $LiCoO_2$, $LiNiO_2$, $LiFeO_2$, and $Li_qNi_rCo_{1-r}O_2$ (q and r have values varying with the charged and discharged state of the battery and usually in the range: $0<q<1$ and $0.7<r<=1$) having a layer structure, LiMn2O4 having a spinel structure, and rhombic $LiMnO_2$. Also used is a substitutional spinel type manganese compound adapted for high voltage operation, such as $LiMet_sMn_{1-s}O_4$ ($0<s<1$), where Met is titanium, chromium, iron, cobalt, nickel, copper, zinc or the like.

It is noted that the above-described lithium complex oxide is prepared, for example, by pulverizing and mixing a carbonate, nitrate, oxide or hydroxide of lithium and a carbonate, nitrate, oxide or hydroxide of a transition metal in accordance with the desired composition, and firing at a temperature in the range of 600 to 1,000° C. under an oxygen atmosphere.

Organic materials may also be used as the positive electrode active material. Examples include polyacetylene, polypyrrole, poly-p-phenylene, polyaniline, polythiophene, polyacene, and polysulfide.

The positive electrode active material as above is mixed with the same conductive agent and binder as used for the negative electrode material, and they are applied to the current collector. A positive electrode may be molded therefrom by a well-known method.

The separator disposed between the positive and negative electrodes is not particularly limited as long as it is stable to the electrolytic solution and holds the solution effectively. General separators include a porous sheet or non-woven fabric of polyolefins, such as polyethylene and polypropylene, of copolymers thereof and of aramide resins. These sheets may be used as a single layer or a laminate of multiple layers. Ceramics such as metal oxides may be deposited on the surface of sheets. Porous glass and ceramics are used as well.

The solvent for a non-aqueous electrolyte secondary battery used in the present invention is not restricted in particular as long as it can serve for the non-aqueous electrolyte.

General solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio.

It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

In the case of using a solid electrolyte or gel electrolyte, a silicone gel, silicone polyether gel, acrylic gel, silicone acrylic gel, acrylonitrile gel, poly(vinylidene fluoride) or the like may be included in a polymer form. These ingredients may be polymerized prior to or after casting. They may be used alone or in admixture.

For example, light metal salts are used for the electrolyte salt.

Examples of the light metal salts include salts of alkali metals such as lithium, sodium and potassium, salts of alkaline earth metals such as magnesium and calcium, and aluminum salts. A choice may be made among these salts or mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the concentration of the electrolyte salt in the non-aqueous electrolyte is preferably 0.5 to 2.0 mole/liter. The conductivity of the electrolyte is preferably 0.01 S/cm or more at a temperature of 25° C., which is adjusted according to the type and concentration of the electrolyte salt.

Moreover, various additives may be added to the non-aqueous electrolyte as needed.

Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

The secondary battery may take any desired shape and is not restricted in particular. In general, the battery is of the coin type in which electrodes and a separator, all punched into coin shape, are stacked, or of the rectangular or cylinder type in which electrode sheets and a separator are spirally wound.

EXAMPLES

Hereinafter, the present invention will be more specifically explained by showing Examples and Comparative Examples. However, the present invention is not restricted thereto.

In Examples below, "%" indicate "mass %", and an average particle size is measured as a cumulative volume 50% size $D_{50}$ (or median diameter) upon measurement of particle size distribution by laser diffractometry.

Example 1

A copper crucible was installed at the inside of a vacuum chamber having exhaust equipment constituted of an oil diffusion pump, a mechanical booster pump, and an oil-sealed rotary vacuum pump. A metallic silicon bulk of 5 kg was introduced into the copper crucible. The pressure of the chamber was reduced, and the pressure reached $2\times10^{-1}$ Pa after 2 hours.

Next, the metallic silicon bulk was melted by an axial electron gun installed at the bottom of the chamber. After the metallic silicon bulk was melted, vapor deposition process was performed at an output of 150 kW for 1 hour. During the vapor deposition process, the temperature of the vapor deposition substrate made of stainless steel was controlled so as to be 400° C.

A vapor-deposited silicon of 800 g was obtained after opening the chamber.

The obtained vapor-deposited silicon was pulverizing at 7,200 rpm with a jet mill (AFG-100 made by Hosokawa Micron Corp.), and thereafter classified by classifier (TC-15 made by NISSHIN ENGINEERING INC.) to obtain silicon particles composed of polycrystalline silicon with $D_{50}$=9.8 μm.

It was confirmed that the crystallite size of the silicon grains in the polycrystalline silicon particles was 40 nm, by the Scherrer method based on the full width at half maximum of the x-ray diffraction line. The true density was 2.311 g/cm$^3$, the compressive strength was 500 MPa, and the BET specific surface area was 1.0 m$^2$/g.

Example 2

Polycrystalline silicon particles were obtained by the same method as Example 1 except that diborane was introduced into the chamber during melting the metallic silicon bulk.

The polycrystalline silicon particle included boron of 10 ppm (on the basis of mass of the polycrystalline silicon particle after doping) with $D_{50}$=9.6 μm. It was confirmed that the crystallite size was 45 nm, by the Scherrer method based on the full width at half maximum of the x-ray diffraction line. The true density was 2.309 g/cm$^3$, the compressive strength was 520 MPa, and the BET specific surface area was 0.95 m$^2$/g.

Example 3

Polycrystalline silicon particles were obtained by the same method as Example 1 except for a temperature of 300° C. of the substrate on which the metallic silicon raw material was vapor-deposited.

The polycrystalline silicon particle had $D_{50}$=10.0 μm. It was confirmed that the crystallite size was 20 nm, by the Scherrer method based on the full width at half maximum of the x-ray diffraction line. The true density was 2.290 g/cm$^3$, the compressive strength was 420 MPa, and the BET specific surface area was 1.8 m$^2$/g.

Example 4

Polycrystalline silicon particles were obtained by the same method as Example 1 except for a temperature of 600° C. of the substrate on which the metallic silicon raw material was vapor-deposited.

The polycrystalline silicon particle had $D_{50}$=10.1 μm. It was confirmed that the crystallite size was 65 nm, by the Scherrer method based on the full width at half maximum of the x-ray diffraction line. The true density was 2.319 g/cm$^3$, the compressive strength was 450 MPa, and the BET specific surface area was 1.1 m$^2$/g.

Example 5

Polycrystalline silicon particles were obtained by the same method as Example 1 except for a temperature of 800° C. of the substrate on which the metallic silicon raw material was vapor-deposited.

The polycrystalline silicon particle had $D_{50}$=10.2 μm. It was confirmed that the crystallite size was 90 nm, by the Scherrer method based on the full width at half maximum of the x-ray diffraction line. The true density was 2.328 g/cm$^3$, the compressive strength was 410 MPa, and the BET specific surface area was 1.1 m$^2$/g.

Example 6

Polycrystalline silicon particles obtained in Example 3 were subjected to the heat treatment at 1000° C. for 3 hours under an argon atmosphere.

The polycrystalline silicon particle had $D_{50}$=10.0 μm. It was confirmed that the crystallite size was 50 nm, by the Scherrer method based on the full width at half maximum of the x-ray diffraction line. The true density was 2.320 g/cm³, the particle compressive strength was 510 MPa, and the BET specific surface area was 1.3 m²/g. The grain size thus increased by the heat treatment. However, the grain size was rather low value in comparison with Example 5, in which the temperature of the substrate was high from the beginning, and therefore it was shown that the heat treatment after taking out the deposited silicon was also useful.

Comparative Example 1

Polycrystalline silicon particles were obtained by the same method as Example 1 except for a temperature of 200° C. of the substrate on which the metallic silicon raw material was vapor-deposited.

The polycrystalline silicon particle had $D_{50}$=10.0 μm. Since the particle was in a crystal state that is near to amorphous, the crystallite size was not able to be identified by the Scherrer method based on the full width at half maximum of the x-ray diffraction line. The true density was 2.224 g/cm³, the compressive strength was 290 MPa, and the BET specific surface area was 6.0 m²/g.

Comparative Example 2

Polycrystalline silicon particles were obtained by the same method as Example 1 except for a temperature of 900° C. of the substrate on which the metallic silicon raw material was vapor-deposited.

The polycrystalline silicon particle had $D_{50}$=10.2 μm. It was confirmed that the crystallite size was 150 nm, by the Scherrer method based on the full width at half maximum of the x-ray diffraction line. The true density was 2.325 g/cm³, the compressive strength was 400 MPa, and the BET specific surface area was 0.95 m²/g.

Comparative Example 3

Polycrystalline silicon particles were obtained by the same method as Example 1 except for a temperature of 100° C. of the substrate on which the metallic silicon raw material was vapor-deposited.

The polycrystalline silicon particle had $D_{50}$=10.1 μm. Since the particle was in a crystal state that is near to amorphous, the crystallite size was not able to be identified by the Scherrer method based on the full width at half maximum of the x-ray diffraction line. The true density was 2.220 g/cm³, the compressive strength was 160 MPa, and the BET specific surface area was 9.4 m²/g.

Comparative Example 4

Polycrystalline silicon particles were obtained by the same method as Example 1 except for a temperature of 1000° C. of the substrate on which the metallic silicon raw material was vapor-deposited.

The polycrystalline silicon particle had $D_{50}$=9.9 μm. It was confirmed that the crystallite size was 280 nm, by the Scherrer method based on the full width at half maximum of the x-ray diffraction line. The true density was 2.331 g/cm³, the compressive strength was 400 MPa, and the BET specific surface area was 0.98 m²/g.

Table 1 shows the results of the silicon grain size, the true density, the compressive strength, the BET specific surface area, the specific electrical resistance, the $D_{50}$ of each of the polycrystalline silicon particles obtained by the manufacturing methods in Examples 1 to 6, and Comparative Examples 1 to 4.

It is to be noted that the true density of the polycrystalline silicon particle was measured by a gas adsorption method (a pycnometer) with a helium gas. The specific electrical resistance was measured by an AC impedance method with four-terminals.

TABLE 1

| | SUBSTRATE TEMPERATURE (° C.) | SILICON GRAIN SIZE (nm) | TRUE DENSITY (g/cm³) | COMPRESSIVE STRENGTH (MPa) | BET SPECIFIC SURFACE AREA (m²/g) | SPECIFIC ELECTRICAL RESISTANCE (Ω · cm) | $D_{50}$ (μm) |
|---|---|---|---|---|---|---|---|
| EXAMPLE 1 | 400 | 40 | 2.311 | 500 | 1.0 | 2.5M | 9.8 |
| EXAMPLE 2 | 400 | 45 | 2.309 | 520 | 0.95 | 56k | 9.6 |
| EXAMPLE 3 | 300 | 20 | 2.290 | 420 | 1.8 | 2.5M | 10.0 |
| EXAMPLE 4 | 600 | 65 | 2.319 | 450 | 1.1 | 2.5M | 10.1 |
| EXAMPLE 5 | 800 | 90 | 2.328 | 410 | 1.1 | 2.5M | 10.2 |
| EXAMPLE 6 | — | 50 | 2.320 | 510 | 1.3 | 2.5M | 10.0 |
| COMPARATIVE EXAMPLE 1 | 200 | — | 2.224 | 290 | 6.0 | 2.4M | 10.0 |
| COMPARATIVE EXAMPLE 2 | 900 | 150 | 2.325 | 400 | 0.95 | 2.5M | 10.2 |
| COMPARATIVE EXAMPLE 3 | 100 | — | 2.220 | 160 | 9.4 | 2.5M | 10.1 |
| COMPARATIVE EXAMPLE 4 | 1000 | 280 | 2.331 | 400 | 0.98 | 2.5M | 9.9 |

As shown in Table 1, it was revealed that, in the negative electrode active materials in Examples 1 to 6 in which the temperature of the substrate on which vapor deposition was carried out by using metallic silicon as a raw material was controlled to temperatures ranging from 300 to 800° C., the grain size of silicon was in the range from 20 to 100 nm, the true density was more than 2.250 g/cm³ and less than 2.330 g/cm³, the compressive strength was more than 400 MPa and less than 800 MPa, and the BET specific surface area was in the range from 0.1 to 5.0 m²/g. All of these thus satisfied the range defined in the present invention.

On the other hand, in the negative electrode active materials in Comparative Examples 1 to 4 in which the temperature of the substrate on which vapor deposition was carried out by using metallic silicon as a raw material was controlled to temperature of less than 300° C. or more than 800° C., at least one of the grain size of silicon, the true density, the compressive strength, and the BET specific surface area was outside the range of the negative electrode active material of the present invention.

Moreover, as shown in Table 1, it was revealed that the negative electrode active material in Example 2 had lower bulk resistance than that of the negative electrode active material in Example 1 because of doping with boron according to the comparison of the specific electrical resistance, and thus had superior conductivity.

< Battery Characteristic Evaluation>

To confirm usefulness of the negative electrode active materials obtained by the manufacturing methods in Examples 1 to 6, and Comparative Examples 1 to 4, the battery characteristics thereof was evaluated.

A mixture of 81% of each of the negative electrode active materials in Examples 1 to 6 and Comparative Examples 1 to 4, 9% of synthetic graphite (an average particle size $D_{50}=3$ μm) as a conductive agent, and 2.5% of dispersion solids of acetylene black in N-methylpyrrolidone (solids 17.5%) was diluted with N-methylpyrrolidone. A polyimide resin made by Ube Industries, Ltd. (trade name: U-Varnish A, solids 18%) as the binder was added thereto in an amount of 7.5% as solids to form a slurry.

The slurry was applied onto a copper foil having a thickness of 12 μm with a 50 μm doctor blade, it was dried at 200° C. for 2 hours, and pressed by a roller press at 60° C. into a negative-electrode-shaped form. Finally, pieces of 2 cm² were punched out to obtain molded negative electrodes.

Four lithium ion secondary batteries for evaluation were manufactured each by using the obtained negative electrode, a lithium foil as a counter electrode, the non-aqueous electrolyte solution obtained by dissolving lithium bis(trifluoromethanesulfonyl)imide in a 1/1 (by volume) mixture of ethylene carbonate and diethyl carbonate at a concentration of 1 mol/liter as the non-aqueous electrolyte, and a polyethylene microporous film having a thickness of 30 μm as a separator.

The manufactured lithium ion secondary batteries were aged overnight at room temperature. Two of the lithium ion secondary batteries were thereafter disassembled, and the thickness of the negative electrodes was measured to calculate electrode density on the basis of initial weight in a state swollen with electrolyte. It is to be noted that it was calculated without including an increased amount of lithium due to charge and of the electrolyte.

With a secondary battery charge/discharge tester (Nagano K. K.), other two of the lithium ion secondary batteries were charged with a constant current of 0.15 c until the voltage of the test cell reached 0 V, and after reaching 0 mV, the battery was charged at a reduced current so that the cell voltage was maintained at 0 mV. When the current value had decreased below 0.02 c, the charging was terminated, and the charge capacity was calculated. It is to be noted that "c" means a current value with which the theoretical capacity of a negative electrode is charged in 1 hour.

After the charging, the lithium ion secondary batteries for evaluation were disassembled, and the thickness of the negative electrodes was measured. The electrode density was calculated from the calculated thickness by the same method as above, and the charge capacity per volume at the charge was calculated. Table 2 shows the results.

TABLE 2

|  | SUBSTRATE TEMPERATURE (° C.) | ELECTRODE DENSITY AFTER AGING (g/cm³) | VOLUME CHANGE RATIO | ELECTRODE DENSITY AFTER CHARGE (g/cm³) | CHARGE CAPACITY (mAh/cc) |
|---|---|---|---|---|---|
| EXAMPLE 1 | 400 | 1.18 | 2.0 | 0.59 | 1,880 |
| EXAMPLE 2 | 400 | 1.22 | 2.1 | 0.58 | 1,950 |
| EXAMPLE 3 | 300 | 1.19 | 2.3 | 0.52 | 1,716 |
| EXAMPLE 4 | 600 | 1.20 | 2.2 | 0.55 | 1,804 |
| EXAMPLE 5 | 800 | 1.18 | 2.4 | 0.49 | 1,551 |
| EXAMPLE 6 | — | 1.18 | 2.1 | 0.56 | 1,878 |
| COMPARATIVE EXAMPLE 1 | 200 | 1.16 | 4.2 | 0.28 | 946 |
| COMPARATIVE EXAMPLE 2 | 900 | 1.18 | 3.5 | 0.34 | 1,122 |
| COMPARATIVE EXAMPLE 3 | 100 | 1.20 | 4.2 | 0.29 | 976 |
| COMPARATIVE EXAMPLE 4 | 1000 | 1.19 | 4.1 | 0.29 | 951 |

As shown in Table 2, the following was revealed. The negative electrode using the negative electrode active materials in Examples 1 to 6 was superior in the electrode density after the aging, the ratio of the volume change, and the electrode density after the charge. The negative electrode had a charge capacity of more than 1500 mAh/cc, and is thus superior in charge and discharge capacity. All of the grain size of silicon, the true density, the compressive strength, and the BET specific surface area of this the negative electrode active material were in the range of the negative electrode active material according to the present invention, by controlling the temperature of the substrate on which vapor deposition was carried out by using metallic silicon as a raw material to temperatures ranging from 300 to 800° C.

On the other hand, in the case of using the negative electrode active material in Comparative Example 1 that was incapable of observing the crystal grain size because of an amorphous state and that had lower true density, the volume expansion was large since the amount of the binder was short due to a large BET specific surface area, and the cycle performance was remarkably low due to a low compressive strength. In addition, in the negative electrode material using the negative electrode active material in Comparative Example 2, having a crystal grain size of more than 100 nm, the volume expansion was large as well as Comparative Example 1. It was revealed that the battery capacity per volume did not therefore increase.

< Cycle Performance Evaluation>

To evaluate the cycle performance of the obtained negative electrode, the negative electrodes were prepared which was made from the negative electrode active materials in Examples 1 and 2, and Comparative Examples 1 and 2. In addition, the positive electrodes were made by using a single layer sheet (trade name: Pioxcel C-100 made by Pionics Co., Ltd.) in which $LiCoO_2$ was used as the active material and an aluminum foil was used as the current collector. Coin-type lithium ion secondary batteries were manufactured by using a non-aqueous electrolyte solution obtained by dissolving lithium hexafluorophosphate in a 1/1 (by volume) mixture of ethylene carbonate and diethyl carbonate at a concentration of 1 mol/liter as the non-aqueous electrolyte and a polyethylene microporous film having a thickness of 30 µm as the separator.

Four of the manufactured coin-type lithium ion secondary batteries were aged two nights at room temperature. With a secondary battery charge/discharge tester (Nagano K. K.), the lithium ion secondary batteries were thereafter charged with a constant current of 1.2 mA (0.25 c on the basis of the positive electrode) until the voltage of the test cell reached 4.2 V, and after reaching 4.2 V, the battery was charged at a reduced current so that the cell voltage was maintained at 4.2 V. When the current value had decreased below 0.3 mA, the charging was terminated. Each of the batteries was discharged at a constant current of 0.6 mA, and the discharging was terminated when the cell voltage reached 2.5 V, and the discharge capacity was obtained.

This operation was repeated 200 cycles. FIG. 1 shows the results.

As shown in FIG. 1 and Table 2, it was revealed that the lithium ion secondary batteries using the negative electrode active materials in Examples 1 and 2 in which the volume expansion was small had higher cycle performance as compared with the lithium ion secondary batteries using polycrystalline silicon particles in Comparative Examples 1 and 2.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A method for manufacturing a negative electrode active material for a non-aqueous electrolyte secondary battery, the method comprising:
   depositing silicon on a substrate by vapor deposition by using a metallic silicon as a raw material, the substrate having a temperature controlled to 300° C. to 800° C. under reduced pressure; and
   pulverizing and classifying the deposited silicon.

2. The method for manufacturing a negative electrode active material according to claim 1, further comprising:
   subjecting the deposited silicon to a heat treatment at 600° C. to 1100° C.

3. The method for manufacturing a negative electrode active material according to claim 2, wherein the silicon to be deposited is doped with one or more dopants selected from the group consisting of boron, aluminum, phosphorus, titanium, vanadium, chromium, manganese, iron, cobalt, nickel, copper, zinc, arsenic, tin, tantalum, and tungsten, at the time of the depositing of the silicon on the substrate.

4. The method for manufacturing a negative electrode active material according to claim 3, wherein the pulverizing and the classifying are performed so that a volume average particle size $D_{50}$ of the negative electrode active material is from 1 µm to 20 µm based on a particle size distribution obtained by laser diffraction scattering.

5. The method for manufacturing a negative electrode active material according to claim 4, wherein the substrate is composed of a material incapable of alloying with silicon at the time of the depositing of the silicon.

6. The method for manufacturing a negative electrode active material according to claim 3, wherein the substrate is composed of a material incapable of alloying with silicon at the time of the depositing of the silicon.

7. The method for manufacturing a negative electrode active material according to claim 2, wherein the substrate is composed of a material incapable of alloying with silicon at the time of the depositing of the silicon.

8. The method for manufacturing a negative electrode active material according to claim 2, wherein the pulverizing and the classifying are performed so that a volume average particle size $D_{50}$ of the negative electrode active material is from 1 µm to 20 µm based on a particle size distribution obtained by laser diffraction scattering.

9. The method for manufacturing a negative electrode active material according to claim 8, wherein the substrate is composed of a material incapable of alloying with silicon at the time of the depositing of the silicon.

10. The method for manufacturing a negative electrode active material according to claim 1, wherein the silicon to be deposited is doped with one or more dopants selected from the group consisting of boron, aluminum, phosphorus, titanium, vanadium, chromium, manganese, iron, cobalt, nickel, copper, zinc, arsenic, tin, tantalum, and tungsten, at the time of the depositing of the silicon on the substrate.

11. The method for manufacturing a negative electrode active material according to claim 10, wherein the substrate is composed of a material incapable of alloying with silicon at the time of the depositing of the silicon.

12. The method for manufacturing a negative electrode active material according to claim 10, wherein the pulverizing and the classifying are performed so that a volume average particle size $D_{50}$ of the negative electrode active material is from 1 µm to 20 µm based on a particle size distribution obtained by laser diffraction scattering.

13. The method for manufacturing a negative electrode active material according to claim 12, wherein the substrate is composed of a material incapable of alloying with silicon at the time of the depositing of the silicon.

14. The method for manufacturing a negative electrode active material according to claim 1, wherein the pulverizing and the classifying are performed so that a volume average particle size $D_{50}$ of the negative electrode active material is from 1 µm to 20 µm based on a particle size distribution obtained by laser diffraction scattering.

15. The method for manufacturing a negative electrode active material according to claim 14, wherein the substrate is composed of a material incapable of alloying with silicon at the time of the depositing of the silicon.

16. The method for manufacturing a negative electrode active material according to claim 1, wherein the substrate is composed of a material incapable of alloying with silicon at the time of the depositing of the silicon.

* * * * *